US012229987B2

(12) United States Patent
Biester et al.

(10) Patent No.: US 12,229,987 B2
(45) Date of Patent: Feb. 18, 2025

(54) SIMULTANEOUS LOCALIZATION AND MAPPING (SLAM) METHOD

(71) Applicant: dSPACE GmbH, Paderborn (DE)

(72) Inventors: Tobias Biester, Karlsruhe (DE); Boris Neubert, Malsch (DE); Veith Roethlingshoefer, Innsbruck (AT)

(73) Assignee: DSPACE GMBH, Paderborn (DE)

( * ) Notice: Subject to any disclaimer, the term of this patent is extended or adjusted under 35 U.S.C. 154(b) by 0 days.

(21) Appl. No.: 18/595,458

(22) Filed: Mar. 5, 2024

(65) Prior Publication Data
US 2024/0303856 A1    Sep. 12, 2024

(30) Foreign Application Priority Data
Mar. 7, 2023    (DE) .......................... 102023105585.2

(51) Int. Cl.
*G06T 7/73*    (2017.01)
*G05D 1/242*    (2024.01)
(Continued)

(52) U.S. Cl.
CPC .............. *G06T 7/73* (2017.01); *G05D 1/2465* (2024.01); *G05D 1/242* (2024.01);
(Continued)

(58) Field of Classification Search
CPC . G06T 7/73; G06T 7/579; G06T 2207/10028; G06T 2207/20021; G05D 1/2465; G05D 1/242; G05D 2111/14
See application file for complete search history.

(56) References Cited

U.S. PATENT DOCUMENTS

| 11,853,070 B2 * | 12/2023 | Montemerlo ...... G01C 21/3446 |
| 11,992,950 B2 * | 5/2024  | Jo ......................... G05D 1/0094 |

(Continued)

FOREIGN PATENT DOCUMENTS

DE    112018000332 T5    9/2019

OTHER PUBLICATIONS

Xia et al, L. A Survey of Image Semantics-based Visual Simultaneous Localization and Mapping: Application-oriented Solutions to Autonomous Navigation of Mobile Robots, Google Scholar, International Journal of Advanced Robotic Systems, vol. 17, Iss. 3, May 2021, pp. 1-17. (Year: 2021).*

(Continued)

*Primary Examiner* — Russell Frejd
(74) *Attorney, Agent, or Firm* — LEYDIG, VOIT & MAYER, LTD.

(57) ABSTRACT

A method for determining an ego pose of a mobile system and creating a surfel map of a surrounding area of the mobile system via an optimization problem represented by a factor graph includes the steps of: receiving environment sensor data generated by an environment sensor attached to the mobile system, wherein the environment sensor surveys the surrounding area of mobile system, and wherein the environment sensor data represent the surrounding area of the mobile system as a point cloud; generating surfels by converting the point cloud of the received environment sensor data into surfel data; identifying new surfels and known surfels in the generated surfels by comparing the surfel data with the surfel map; and adding a surfel factor for the known surfels to the factor graph and/or adding a surfel node and a surfel factor for the new surfels to the factor graph.

14 Claims, 7 Drawing Sheets

(51) Int. Cl.
*G05D 1/246* (2024.01)
*G05D 111/10* (2024.01)

(52) U.S. Cl.
CPC .............. *G05D 2111/14* (2024.01); *G06T 2207/10028* (2013.01); *G06T 2207/20021* (2013.01)

(56) References Cited

U.S. PATENT DOCUMENTS

| | | | |
|---|---|---|---|
| 2018/0161986 A1* | 6/2018 | Kee | G06V 20/10 |
| 2019/0026943 A1 | 1/2019 | Yan et al. | |
| 2020/0080848 A1 | 3/2020 | Sprague et al. | |
| 2021/0380125 A1* | 12/2021 | Hernandez Esteban | G06T 7/77 |
| 2021/0381843 A1* | 12/2021 | Montemerlo | G05D 1/0285 |
| 2022/0097726 A1* | 3/2022 | Buchanan | G05D 1/249 |
| 2022/0204019 A1 | 6/2022 | Lauterbach et al. | |
| 2023/0027622 A1* | 1/2023 | Haeusler | G01S 7/497 |
| 2023/0221125 A1* | 7/2023 | Nachstedt | G05D 1/0278 701/445 |
| 2023/0281866 A1* | 9/2023 | Hernandez Esteban | G06F 18/24155 701/23 |
| 2024/0067211 A1* | 2/2024 | Dolgov | B60W 50/0098 |
| 2024/0219569 A1* | 7/2024 | Govardhanam | G06T 15/005 |

OTHER PUBLICATIONS

Ebadi et al, K. Present and Future of SLAM in Extreme Underground Environments, Google Scholar, Cornell University, Computer Science, Robotics, Aug. 2022, pp. 1-21. (Year: 2022).*
Kim et al, P. SLAM-driven Robotic Mapping and Registration of 3D Point Clouds, Google Scholar, Elsevier, Automation in Construction, 2018, pp. 38-48. (Year: 2018).*
Cwian et al, K. Large-Scale Lidar SLAM with Factor Graph Optimization on High-Level Geometric Features, Google Scholar, MDPI, Sensors, 2021, pp. 1-31. (Year: 2021).*
Behley Jens et al: "Efficient Surfel-Based SLAM using 3D Laser Range Data in Urban Environments", Robotics: Science and Systems XIV, Jun. 26, 2018 (Jun. 26, 2018), pp. 1-10, XP055812701, US.
Shan Tixiao et al: "LIO-SAM: Tightly-coupled Lidar Inertial Odometry via Smoothing and Mapping", 2020 IEEE/RSJ International Conference On Intelligent Robots and Systems (IROS), Oct. 24, 2020 (Oct. 24, 2020), pp. 5135-5142, XP93189804, US.
Dellaert Frank: "Factor Graphs: Exploiting Structure in Robotics", Jan. 12, 2021 (Jan. 12, 2021), pp. 141-166, XP93189770, US.

* cited by examiner

SIMULTANEOUS LOCALIZATION AND MAPPING (SLAM) METHOD

CROSS-REFERENCE TO PRIOR APPLICATION

This application claims benefit to German Patent Application No. DE 102023105585.2, filed on Mar. 7, 2023, which is hereby incorporated by reference herein.

FIELD

The invention relates to a computer-implemented method for determining an ego pose of a mobile system and creating a surfel map, based on 3D ellipsoids, of a surrounding area.

In addition, the invention relates to a data processing device for carrying out the above method.

The invention also relates to a computer program product comprising commands which, when the program is executed by a computer, cause said computer to carry out the above method.

The invention furthermore relates to a computer-readable data medium on which the above computer program product is stored.

BACKGROUND

SLAM (Simultaneous Localization and Mapping) refers to the algorithmic problem of creating a map of the surrounding area by evaluating sensor data of an environment sensor of a mobile system, for example a vehicle, and of simultaneously estimating the position of the mobile system in space (also referred to as the ego pose) within that map.

One challenge with computer-aided methods for solving SLAM problems is that exactly determining the pose requires an accordingly detailed map, but generating a detailed map requires the exact pose of the mobile system to be known. It thus becomes clear that these two challenges of map creation and self-localization cannot be solved independently of one another. A SLAM problem is thus a chicken-and-egg problem since neither the map nor the pose is known, but rather both have to be simultaneously estimated.

Conventional SLAM algorithms are generally tailored to the available resources, such as the type of available sensor data of the mobile system, for example LiDAR data, inertia sensor data, GPS data, and/or data of the power train system. SLAM algorithms are used, among other applications, for assisting navigation in mobile systems such as autonomous robot systems, self-driving vehicles, and/or unmanned aerial vehicles.

A further application of SLAM algorithms is in the creation of annotated datasets. In this case, SLAM algorithms are used as a preparatory step in annotation projects in order to improve annotation results created both manually and automatically. Annotated datasets are, for example, a prerequisite for training some algorithms based on machine learning. Unlike SLAM algorithms used directly in mobile systems for navigation assistance, which are generally also optimized for computing speed, the computing speed for SLAM algorithms used in dataset annotation is often a secondary consideration. In addition, SLAM algorithms used directly in mobile systems for navigation assistance are optimized for the resources made available by the mobile system. However, since annotating datasets does not involve processing data from only one specific mobile system having a specific predefined sensor configuration, it is advantageous for SLAM algorithms in such cases if the SLAM algorithm can handle different resources flexibly.

Conventional SLAM algorithms are generally able to generate very good results using datasets that have a relatively large number of readily distinguishable features. Such datasets are normally recorded in urban environments when driving at low speed, the advantage of the low speed being that the mobile system (in most cases a vehicle) has only advanced slightly in terms of location between successive individual images from the environment sensor. The results of such SLAM algorithms are, however, much less reliable in more challenging datasets that have been recorded under different conditions, for example when driving on a motorway. Owing to the similarity in the sensor data between the successive individual images, which often stems from either the repetitive planting at the side of motorways or the crash barrier, mapping features is difficult owing to their similarity to one another. In addition, the higher speed of the vehicle and the presence of dynamic objects, such as other road users, pose further challenges.

In other words, therefore, conventional SLAM algorithms have flaws when it comes to challenging datasets, such as datasets having a limited number of identifiable and comparable features between the individual images, datasets recorded while the mobile system is traveling at high speed, and/or datasets containing dynamic objects.

SUMMARY

In an exemplary embodiment, the present invention provides a computer-implemented method for determining an ego pose of a mobile system and creating a surfel map, based on 3D ellipsoids, of a surrounding area of the mobile system via an optimization problem represented by a factor graph. The method comprises the steps of: receiving environment sensor data generated by an environment sensor attached to the mobile system, wherein the environment sensor surveys the surrounding area of mobile system, and wherein the environment sensor data represent the surrounding area of the mobile system as a point cloud: generating surfels by converting the point cloud of the received environment sensor data into surfel data: identifying new surfels and known surfels in the generated surfels by comparing the surfel data with the surfel map; and adding a surfel factor for the known surfels to the factor graph and/or adding a surfel node and a surfel factor for the new surfels to the factor graph: wherein a node of the factor graph represents a specific ego pose of the mobile system, or a surfel node of the factor graph represents a specific surfel in map coordinates: wherein an edge between a node that represents an ego pose and a node that represents a surfel represents, as a surfel factor, a spatial restriction between the ego pose represented by the node and the surfel that is identifiable for the environment sensor from the specific ego pose, and includes a probability distribution in relation to the representability of the surfel for the environment sensor from the specific ego pose; and wherein the factor graph representing the optimization problem is incrementally created after the environment sensor data of a first specific time period are received, and the optimization problem is incrementally solved before the surfel factors of the known surfels are added to the factor graph and/or before the surfel nodes and surfel factors of the new surfels are added to the factor graph and the steps are repeated for environment sensor data of a later specific time period than the first specific time period.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Exemplary embodiments of the invention provide a SLAM algorithm that can flexibly handle different available resources and/or yields reliable results even with challenging datasets.

According to the invention, therefore, a computer-implemented method is provided for determining an ego pose of a mobile system and creating a surfel map, based on 3D ellipsoids, of a surrounding area via an optimization problem represented by a factor graph, comprising the steps of:
receiving environment sensor data, wherein the environment sensor data have been generated by at least one environment sensor that is attached to the mobile system and surveys the area surrounding the mobile system, and wherein the environment sensor data represent the area surrounding the mobile system as a point cloud, in each case in a specific time period, generating surfels by converting the point cloud of the received environment sensor data into surfel data,
identifying new surfels and known surfels in the generated surfels by comparing the surfel data with the surfel map, and adding a surfel factor for the surfels identified as known surfels to the factor graph, and/or adding a surfel node and a surfel factor for surfels identified as new surfels to the factor graph, wherein a node of the factor graph represents a specific ego pose of the mobile system or, when in the form of a surfel node, a specific surfel in map coordinates,
wherein an edge between a node that represents an ego pose and a node that represents a surfel represents, as a surfel factor, a spatial restriction between the ego pose represented by the node and the surfel that is identifiable for the environment sensor from said specific ego pose, and includes a probability distribution in relation to a representability of that surfel for the environment sensor from said specific ego pose, and
wherein the factor graph representing the optimization problem is incrementally created after the environment sensor data of a first specific time period are received, and the optimization problem is incrementally solved before the surfel factors of the surfels identified as known surfels and/or before the surfel nodes and surfel factors of the new surfels are added to the factor graph, and the steps are repeated for environment sensor data of a later specific time period than the first specific time period.

In other words, the method according to the invention is a SLAM algorithm that models the optimization problem as a factor graph. Factor graphs are a form of probabilistic graphical model. They allow the problem to be abstracted in a way that makes it simpler to find computer-implemented solution methods for the optimization problem. The nodes in the factor graph represent the unknown variables of the optimization problem (in the present case: the ego pose of the mobile system in a specific time period and the pose of the surfels in map coordinates), the factors of the factor graph constituting probabilistic restrictions to these variables, which are based on measurement results and/or existing knowledge. When solving an optimization problem represented by such a factor graph, firstly a specific set of values for the unknown variables is used as the starting values, and it is ascertained how well these values solve the optimization problem. By varying the values, the values that best solve the problem represented by the factor graph are found for the variables.

In the present case, a mobile system may be construed as any system that can move in an environment, for example air, water, or land. The mobile system can be configured, for example, as a vehicle, an aircraft, a robot, a rail-borne vehicle, or a ship. Preferably, the mobile system is a vehicle, i.e., a mobile system that moves on land. Further preferably, the mobile system is not a rail-borne vehicle, and particularly preferably it is a motor vehicle.

In the present case, the pose should be construed as the position and orientation (or alignment) of an object. The ego pose is thus the position and orientation of the mobile system. The pose of the surfel in the surfel map should be construed accordingly as the position and orientation of a surfel in map coordinates.

Preferably, the environment sensor data are LiDAR data and the environment sensor is a LiDAR sensor. LiDAR is a form of three-dimensional laser scanning in which laser beams are used to ascertain the distance.

The specific time period of the method is a time period within which the environment sensor generated the point cloud. The specific time period is also referred to as a frame. In relation to the LiDAR sensor as the environment sensor, the length of the time period is thus related to how quickly the LiDAR sensor performs one revolution. At 600 rpm, the time period is 0.1 seconds, for example. In this time period, a point cloud comprising points from the surrounding area is generated. By way of example, a LiDAR sensor having 64 scanning channels can output 1.33 million points per second. In this example, therefore, with an rpm of 600, the LiDAR sensor updates 10 frames per second with 0.133 million measurement points per frame.

One aspect of the invention is that the map is based on 3D ellipsoids. Since 3D ellipsoids are also referred to as ellipsoid surfels (short for surface element), the map is thus a surfel map. In the surfel map, therefore, an object is represented by one or more 3D ellipsoids. Preferably, each surfel is an approximation of one group of points. Further preferably, a surfel comprises one or more items of information related to a center of the surfel, a rotation of the surfel (in particular information regarding the orientation of two local principal axes of the surfel), an extent of the surfel along its three principal axes, a distribution of measurement times of the points along the three principal axes and/or an approximation of the distribution of measurement times, and a value for a resemblance of the surfel to a pole and/or a value for a resemblance of the surfel to a disk.

Further preferably, the approximation of the distribution of measurement times comprises at least four, preferably six, measurement times originating from the measurement times of the points of the point cloud. Particularly preferably, they are measurement times of the four points that define the maximum extent of the surfel along the two longest principal axes, and further preferably they are measurement times of the six points that define the maximum extent of the surfel along the three principal axes.

Preferably, a pole-like surfel is a surfel that has a large extent along exactly one principal axis and a small extent along the two other principal axes. Preferably, a disk-like surfel is a surfel that has a small extent along exactly one principal axis and a large extent along the two other principal axes. The value for the resemblances to a pole and/or disk is therefore preferably generated from the extents of the surfel along its three principal axes.

A further aspect of the invention is the incremental creation of the factor graph and the incremental solving of the optimization problem represented by that factor graph. In other words, in this manner, the solution for the ego pose of the mobile system in map coordinates is not sought for each individual specific time period alone, but rather the surfels in map coordinates are incrementally integrated into the factor graph as optimizable variables. In particular, the optimization problem is incrementally solved before the surfel factors of the surfels identified as known surfels and/or the surfel nodes and surfel factors of the surfels identified as new surfels are added to the factor graph, and the steps are repeated with environment sensor data from a later time period. Further preferably, the optimization problem is incrementally solved before the surfel data are compared with the surfel map. This makes it possible to handle both the intrinsic uncertainties in the surfel map caused by measurement inaccuracies, and a distortion in the point cloud of the environment sensor data owing to the egomotion of the mobile system when the environment sensor data are recorded. When the mobile system is traveling at high speed, as occurs when driving on the motorway for example, this leads to the points of the point cloud in a specific time period not forming an accurate representation of the area surrounding the mobile system since they are distorted by the egomotion of the mobile system. By adding the surfel factor for a surfel that has already been seen to the factor graph, the pose of that surfel, i.e., the position and orientation of the surfel, is optimized. In other words, therefore, the representation of the surrounding area is also optimized during the method, so as to compensate for the disadvantages resulting from the inaccurate representation of the surrounding area by the sensor.

The method according to the invention is particularly suitable for evaluating challenging datasets that, for example, have been recorded at high speed, include dynamic objects, and/or have few identifiable and comparable features. In addition, the method according to the invention is particularly suitable for use in annotation projects since the method yields results even when only the received environment sensor data are available as a resource and no access is available to other resources such as inertia sensor data, GPS data, and/or data of the power train system, for example wheel speed sensor data of the mobile system. The design of the method allows further resources to be flexibly integrated, meaning that it can be flexibly expanded, which is highly advantageous especially for annotation projects.

In relation to the high flexibility of the method, it is provided according to a preferred development of the invention that an edge between two nodes representing ego poses comprises an egomotion factor, which represents a spatial restriction between the ego poses represented by each node and comprises a probability distribution in relation to a transformation between the two ego poses.

When no further resources are available, it is preferably provided that the egomotion factor is based on model assumptions of an egomotion model. The egomotion model preferably calculates a pose error of the mobile system as the difference between the current pose and the last pose propagated at the speed. Preferably, a speed error is calculated as the simple difference between two successive speeds. The method is thus preferably based on the premise that the difference between the speed of the mobile system in two directly successive time periods is low.

However, when further resources are available, it is preferably provided that the method comprises the step of receiving egomotion sensor data, for example inertia sensor data, GPS data, and/or data of the power train system, such as wheel speed sensor data of the mobile system, and the egomotion factor is based on model assumptions of the egomotion model and on the received egomotion sensor data.

In the case of GPS data as resources, it is preferably provided that the egomotion factor is based at least partially on a difference between the estimated ego pose of the mobile system and the ego pose of the mobile system ascertained from the GPS data. In the case of inertia sensor data and/or data of the power train system, such as wheel speed sensor data, it is preferably provided that the egomotion factor is based at least partially on a difference between the inertia sensor data and/or the data of the power train system that have been recorded in two directly successive time periods.

Since the surfel data are preferably first recorded in local coordinates of the mobile system on the basis of the environment sensor data but the surfel map is not in these local coordinates, the method preferably comprises the step of transforming the surfel data from local coordinates of the mobile system into map coordinates of the surfel map. Furthermore, according to a preferred development of the invention, it is provided that the step of generating surfels by converting the point cloud of the received environment sensor data into surfel data comprises generating surfels in local coordinates of the mobile system, and the step of identifying new surfels and known surfels in the generated surfels by comparing the surfel data with the surfel map comprises transforming the surfels generated in local coordinates of the mobile system into surfels in map coordinates.

In other words, in an alternative, surfel data are therefore preferably first generated on the basis of the point cloud of the received environment sensor data by generating surfels in local coordinates of the mobile system. Preferably, these surfel data are then transformed into the map coordinates. Preferably, the estimated ego pose of the mobile system in relation to the specific time period of the survey of the environment sensor data is taken into account in the transformation, the estimated ego pose of the mobile system in that time period being known owing to the incremental solving of the optimization problem represented by the factor graph.

Alternatively, it is preferably provided that the method comprises the step of transforming the point cloud from local coordinates of the mobile system into map coordinates of the surfel map. In this context, it is preferably also provided that the step of generating surfels by converting the point cloud of the received environment sensor data into surfel data comprises generating surfels in map coordinates by converting into surfel data the point cloud of the received environment sensor data that has been transformed into map coordinates.

As already mentioned, the optimization problem is incrementally solved. Since the optimization problem is particularly preferably solved before the surfels or the point cloud is/are transformed from local coordinates of the mobile system into map coordinates, the current estimation of the ego pose of the mobile system is always used for transforming the coordinates.

If the ego pose of the mobile system were hypothetically entirely correctly estimated, the surfels identified as known surfels in the generated surfels would be mapped entirely correctly onto the surfels present in the surfel map during the comparison with the surfel map. However, since both the ego pose and the surfel map are estimations, the surfels identified as known surfels are generally not mapped entirely correctly onto the surfels present in the surfel map. This error between the surfel in the surfel map and the transformed surfel or the surfel generated from the transformed point cloud is referred to hereinafter as the mapping error. Preferably, for disk-like surfels, the mapping error comprises a symmetrical point-plane distance between the surfel of the surfel map and the transformed surfel or the surfel generated from the transformed point cloud, and for pole-like surfels, it comprises a symmetrical point-line distance between the surfel of the surfel map and the transformed surfel or the surfel generated from the transformed point cloud.

In addition, for both disk-like and pole-like surfels, the mapping error preferably comprises a rotation error between the surfel of the surfel map and the transformed surfel or the surfel generated from the transformed point cloud, the rotation error being given by the angle between the normal vectors of the two surfels.

In the present case, a symmetrical point-plane distance should be construed as the average of the following two distances d1 and d2, the first surfel designating the surfel of the surfel map and the second surfel designating the transformed surfel or the surfel generated from the transformed point cloud: d1 is the shortest distance between the center of the first surfel and a plane of the second surfel defined by the two longest principal axes: d2 is the shortest distance between the center of the second surfel and a plane of the first surfel defined by the two longest principal axes.

In the present case, a symmetrical point-line distance should be construed as the average of the following two distances d3 and d4, the first surfel designating the surfel of the surfel map and the second surfel designating the transformed surfel or the surfel generated from the transformed point cloud: d3 is the shortest distance between the center of the first surfel and a line of the second surfel defined by the longest principal axis: d4 is the shortest distance between the center of the second surfel and a line of the first surfel defined by the longest principal axis.

In other words, the purpose of the surfel factor added in the next step of the method for the surfels identified as known surfels is so that said mapping error between the surfel of the surfel map and the transformed surfel or the surfel generated from the transformed point cloud is taken into account in the further optimization. Preferably, therefore, the step of adding the surfel factor for the surfels identified as known surfels to the factor graph comprises adding the surfel factor for the surfels identified as known surfels to the factor graph while taking into account the mapping error between the surfel of the surfel map and the transformed surfel or the surfel generated from the transformed point cloud.

Further preferably, the step of identifying new surfels and known surfels in the generated surfels by comparing the surfel data with the surfel map comprises refining the estimated ego pose of the mobile system before the surfels are transformed from the local coordinates of the mobile system into the map coordinates. Preferably, the estimated ego pose is refined on the basis of modified surfels, the modified surfels being generated from the point cloud available in local coordinates of the mobile system via a generalized iterative closest point algorithm.

To identify known surfels in the generated surfels, proposals are generated, preferably via a balanced search tree and in particular via a k-d tree, for surfel data available in map coordinates, which are then compared with the surfel map. Preferably, surfels of the surfel data not identified in this way as known surfels are identified as new surfels.

Likewise, in relation to the step of identifying new surfels and known surfels in the generated surfels by comparing the surfel data with the surfel map, it is preferably provided that a predefined subset of the set of surfels identified as known surfels is reused. In point clouds having many points, many redundant identifications of known surfels may take place. To improve the computing performance, preferably just one subset thereof is reused. The subset is preferably ascertained by sorting the surfels identified as known surfels into a low-resolution grid on the basis of their pose. From this grid, a greedy algorithm preferably selects a predefined number of surfels identified as known surfels, which form the reused subset.

In relation to generating the surfels from the point cloud, it is preferably provided that this is done via a recursive method based on a principal-component analysis. In this way, the goal of generating from the point cloud the largest possible surfels that simultaneously have a maximum resemblance to a pole or a disk can be achieved in a simple manner. Generating such surfels allows the surrounding area to be mapped to a highly dynamic level of detail. In this way, for example, a good LiDAR data-based representation of a road is possible, in which there is a large distance between the individual rings among the ring patterns generated by the LiDAR and at the same time a high level of detail is possible as regards the crash barriers and/or marker posts.

A principal-component analysis is a mathematical method that is also known as a principal-axis transformation or a singular value decomposition. It allows extensive datasets to be structured using the eigenvectors of the covariance matrix. In other words, datasets can be illustrated by approximating a multitude of statistical variables using a smaller number of the most significant linear combinations possible—the so-called principal components.

In this regard, according to another preferred development of the invention, it is provided that the step of generating surfels by converting the point cloud of the received environment sensor data into surfel data is carried out recursively and comprises the following steps:

assigning individual points of the point cloud to predefined voxels, wherein each voxel constitutes a volume fraction of the surrounding area, generating first surfels for all the voxels by carrying out a principal-component analysis using the points, which are each assigned to one voxel.

subdividing all the voxels into subvoxels and then generating second surfels for all the subvoxels by carrying out a principal-component analysis using the points assigned to the subvoxel in each case, comparing a quality rating of the generated first surfels with the generated second surfels, and repeatedly carrying out the two previous steps until the comparison of the quality rating of the generated first surfels gives a better quality rating for the first surfel or until the subvoxel generated by subdividing falls below a predefined minimum number of points.

In a first step, therefore, the points are grouped in voxels. A voxel (or volume element) corresponds to a volume fraction of the surrounding area. Preferably, a voxel corresponds to a volume fraction of around 4 $m^3$. Preferably, the voxels set an upper limit for the size of the surfels since it is preferably provided that it is not possible to generate a surfel that is larger than a voxel. Since the method is carried out recursively, when repeatedly carrying out the two previous steps, the previous subvoxel additionally supersedes the voxel from which the second surfels are generated in the step of subdividing all the voxels into subvoxels. In the further step of comparing the quality rating, therefore, the quality rating of these newly generated second surfels is also compared with the quality rating of the second surfels generated in the previous run, and so the previous second surfels supersede the first surfels.

In relation to the quality rating of the surfels, according to another preferred development of the invention, it is provided that the quality rating comprises an average of a weighted sum of the following values over all the generated surfels: a value based on the extent of the surfel along its three principal axes, preferably along the two longest principal axes, a value based on the extent of the surfel along its shortest principal axis, a value based on the combination, in particular the ratio, of the two aforementioned values, and a value based on the resemblance of the surfel to a pole. This quality rating allows the most suitable surfels to be found in a simple manner.

To obtain particularly reliable results using datasets in which dynamic objects appear, according to a preferred development of the invention, it is provided that each surfel is assigned a dynamic value that can be varied when solving the optimization problem, and the dynamic value characterizes the surfel as non-dynamic when starting to solve the optimization problem. Preferably, the dynamic value is a value from the value range of 0 to 1 (or 0% to 100%), a dynamic value of 0 characterizing the surfel as fully static and a dynamic value of 1 characterizing the surfel as fully dynamic. Static surfels are assumed not to change their pose over time, but with dynamic surfels it is assumed that the pose of the surfel does change over time.

Preferably, it is provided that each initialization value is 0, i.e., it is assumed that the surfel is fully static. Preferably, the dynamic value can be varied and is part of the optimization problem. As a result, the dynamic value of the surfel can be changed during the optimization if doing so leads to better results.

In this regard, according to another preferred development of the invention, it is provided that each surfel is assigned the dynamic value that can be varied when solving the optimization problem, the mapping error between the known surfels and the generated surfels is determined in the step of identifying new surfels and known surfels in the generated surfels by comparing the surfel data with the surfel map, and the mapping error is weighted with the dynamic value when solving the optimization problem. In other words, when solving the optimization problem the above-described mapping error is given less weight depending on how dynamic a surfel is. In particular, this is done by multiplying the mapping error by the difference between 1 and the dynamic value of the surfel.

Additionally in this regard, according to another preferred development, it is provided that an increase in the dynamic value of the surfel while the optimization problem is being solved is penalized. This prevents the optimization algorithm from converging toward a solution in which all the surfels have a dynamic value of 1, in which case the mapping error of all the surfels would no longer need to be taken into consideration. In other words, therefore, the optimization algorithm can find a balance in this manner since a high mapping error is given less weight for more dynamic surfels than for more static surfels.

In relation to varying the dynamic value, it is preferably provided that, via a voxel map, the dynamic values of the surfels located inside a voxel present in the voxel map are tracked over time via a moving average, and in particular via an exponentially smoothed average, the dynamic value of surfels, and preferably of disk-like surfels within a voxel, is varied toward static when the moving average of the voxel falls below a predefined limit, and/or the dynamic value of surfels, and preferably of disk-like surfels within a voxel, is varied toward dynamic when the moving average of the voxel exceeds the predefined limit.

The way in which the dynamic value is varied is based on the notion that it is highly likely that regions in which there was previously a dynamic object will not suddenly contain a static object. Thus, it is more likely that a new surfel at a location in the surfel map where there are already dynamic surfels is dynamic too. Preferably, therefore, the surfels are first assigned to voxels in the voxel map. If a surfel is intended to be assigned to a voxel located at a location in the voxel map in which no voxel has yet been recorded because no surfel has yet been seen in that volume fraction, a new voxel is added at said location in the voxel map and the dynamic value of that one surfel is assigned to this new voxel. If, however, a surfel is assigned to a voxel that is already present in the voxel map because other surfels have already been seen in that volume fraction, the dynamic value assigned to said present voxel is preferably updated using the exponentially smoothed average. The updated dynamic value of the voxel is then preferably compared with a limit; if the limit is not reached, the dynamic value is reduced for all the surfels, and particularly preferably for all the disk-like surfels, within the voxel, and if the limit is exceeded, the dynamic value is increased for all the surfels, and preferably all the disk-like surfels, within the voxel.

Furthermore, in relation to the dynamic value, according to a preferred development of the invention it is provided that each surfel is assigned the dynamic value that can be varied when solving the optimization problem, surfels identified as known surfels are combined into clusters on the basis of their spatial distance from one another and/or their similar orientation to one another, and the factor graph has a cluster factor for each cluster such that differences in the dynamic value of the surfels within a cluster while the optimization problem is being solved are penalized.

In other words, owing to the cluster factor, the optimization algorithm favors solutions in which the surfels belonging to one cluster have very similar dynamic values. The premise behind this is that surfels belonging to an object, for example another road user, must also have similarly high dynamic values since the object is moving as a unit.

Preferably in this regard, combining surfels identified as known surfels into clusters comprises identifying a predefined number of neighboring surfels closest to a specific surfel via a k-nearest-neighbor algorithm and selecting a subgroup of these identified neighboring surfels by comparing the difference in the pose of the neighboring surfels to the specific surfel with predefined limits. In particular, the distance from the neighboring surfel to the specific surfel is compared with a first predefined limit, and the angle between the normal vectors of the neighboring surfel and the specific surfel is compared with a second predefined limit. If both comparisons show that the pose of the neighboring surfel is very similar to the pose of the specific surfel, it is assumed that the neighboring surfel is a surfel that belongs to the same object. In other words, the surfels in said subgroup thus approximate to surfels that belong to the same object. In the event that one of the surfels of the subgroup has already been assigned to a cluster and the other surfels have not yet been assigned to a cluster, the further surfels of the subgroup are assigned to the same cluster. In the event that none of the surfels of the subgroup has already been assigned to a cluster, a new cluster is generated. In the event that a surfel of the subgroup is assigned to a first cluster and a further surfel of the subgroup is already assigned to a different cluster, a new cluster is not generated, nor are the surfels reassigned to other clusters. In other words, the existing assignment of the surfels to clusters is retained in the third case.

According to another preferred development of the invention, it is also provided that the received environment sensor data additionally have a measurement time for each point of the point cloud, and the step of identifying new surfels and known surfels in the generated surfels by comparing the surfel data with the surfel map comprises generating rectified surfels from the surfel data by taking account of an estimated speed of the mobile system and comparing the rectified surfel data with the surfel map. As a consequence of each point of the point cloud having a measurement time, the surfel preferably comprises the distribution of measurement times of the points along the three principal axes and/or the approximation of the distribution of measurement times. This information is thus preferably used to rectify the surfels.

Since many environment sensors measure distances by one or more lasers revolving about themselves, a so-called rolling-shutter effect occurs as the mobile system travels further. This effect occurs because the location of the environment sensor at the measurement time of the first data point of the revolution of the laser is not the same as at the last data point of the revolution of the laser. Therefore, if all the points of the point cloud recorded in the specific time period of one revolution are considered as if they were an individual image in which the environment sensor had not traveled any further, the points will appear distorted.

To take this effect into account, therefore, when the surfel data are compared with the surfel map, rectified surfels are preferably generated by ascertaining a new center of the surfel and a new rotation of the surfel by taking the estimated speed of the mobile system into account. These rectified surfels are then used to subsequently ascertain the mapping error.

This procedure is particularly advantageous if no egomotion sensor data, for example inertia sensor data, GPS data, and/or data of the power train system, such as wheel speed sensor data of the mobile system, are available and only the environment sensor data are received. In a case such as this, the estimated speed of the mobile system is very unreliable at the start of the optimization. Unless the surfels are rectified, strong rolling-shutter effects in combination with the unreliably estimated speed could lead to drift in the optimization, which could impair the result of the overall optimization.

According to another preferred development of the invention, it is provided that the factor graph has at least one node that represents an attachment height of one or more environment sensors on the mobile system, and the method comprises the steps of:

identifying surfels in the surfel map that represent roads, and adding an environment sensor attachment factor to the factor graph for surfels identified as surfels representing a road.

Where there is a plurality of environment sensors, it is furthermore preferably provided that the node representing the attachment height takes account of the orientation of the plurality of environment sensors with respect to one another.

In particular in the application in which the mobile system is configured as a motor vehicle, it can be assumed that the attachment height and the basic orientation of the environment sensor or the basic orientation of the environment sensors with respect to one another on the mobile system do not change in relation to the road while the surrounding area is being surveyed. Preferably, this assumption is implemented to the effect that the attachment height, as a further optimizable variable, is represented as a node in the factor graph, and surfels representing a road are identified in the surfel map. Surfels representing roads are preferably identified on the basis of a strong resemblance to a pole, their orientation in relation to the estimated ego pose of the mobile system, and/or the position of their center below the estimated ego pose of the mobile system.

According to another preferred development, the method comprises the step of removing surfels from the surfel map, the removed surfel not having been used after a predetermined number of optimizations to identify known surfels in the step of identifying new surfels and known surfels in the generated surfels by comparing the surfel data with the surfel map. In other words, therefore, surfels only seen once are removed from the surfel map again after a predetermined time. As a result of surfels being removed from the surfel map, less computing power is needed in the step of identifying new surfels and known surfels in the generated surfels by comparing the surfel data with the surfel map.

According to another preferred development, the method comprises the step of excluding a further optimization of a surfel if that surfel has not been used to identify known surfels for a predefined amount of time, if that surfel has contributed a predefined number of surfel factors to the factor graph, and/or if that surfel has already been part of the optimization problem for more than a predefined number of iterations. In other words, surfels can thus preferably be excluded from optimization for performance reasons in numerical optimization. A surfel is preferably excluded from further optimization by replacing the surfel factor with a surfel freeze factor in the factor graph.

In another exemplary embodiment, a data processing device carries out the above-described method.

The invention also relates to a computer program product comprising commands which, when the program is executed by a computer, cause said computer to carry out the above-described method.

According to the invention, a computer-readable data medium is furthermore provided, on which the above computer program product is stored.

The technical advantages of the data processing device, computer program product, and computer-readable data medium become apparent to a person skilled in the art from the description of the method for determining the ego pose of the mobile system and creating the surfel map, based on 3D ellipsoids, of the surrounding area, and from the embodiment examples described hereinafter.

Figure 1:
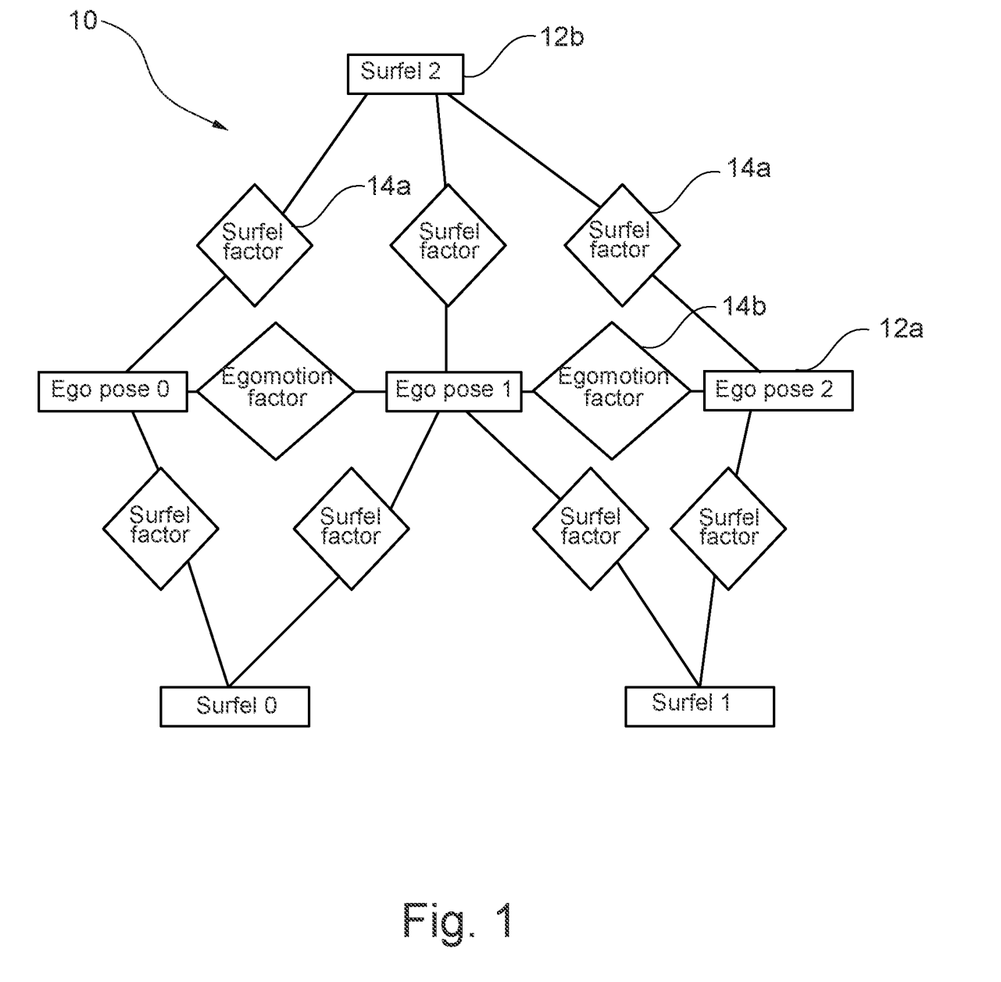
FIG. 1 schematically shows an example factor graph that has been created by a computer-implemented method for determining an ego pose of a mobile system and creating a surfel map, based on 3D ellipsoids, of a surrounding area (SLAM method), according to a preferred embodiment example of the invention.

FIG. 1 schematically shows an example factor graph 10, as created by a computer-implemented method for determining an ego pose of a mobile system and creating a surfel map, based on 3D ellipsoids, of a surrounding area (SLAM method), according to a preferred embodiment example. Factor graphs 10 are a form of probabilistic graphical model. The nodes 12 in the factor graph 10 represent the unknown variables of the optimization problem whereas factors 14 of the factor graph 10 constitute probabilistic restrictions to these variables, which are based on measurement results and/or existing knowledge.

In this embodiment example, the factor graph 10 in FIG. 1 has nodes 12a, which represent a specific ego pose of the mobile system, and surfel nodes 12b, which represent a specific surfel 16 in map coordinates. In addition, edges between a node 12a representing an ego pose and a node 12b representing a surfel 16 have so-called surfel factors 14a. The surfel factors 14a represent a spatial restriction between the ego pose represented by the node 12a and the surfel 16 that is identifiable for the environment sensor from said specific ego pose, and comprise a probability distribution in relation to a representability of that surfel 16 for the environment sensor from said specific ego pose. Furthermore, edges between two nodes 12a representing ego poses include an egomotion factor 14b, which represents a spatial restriction between the ego poses represented by each node 12a and includes a probability distribution in relation to a transformation between the two ego poses.

Figure 2:
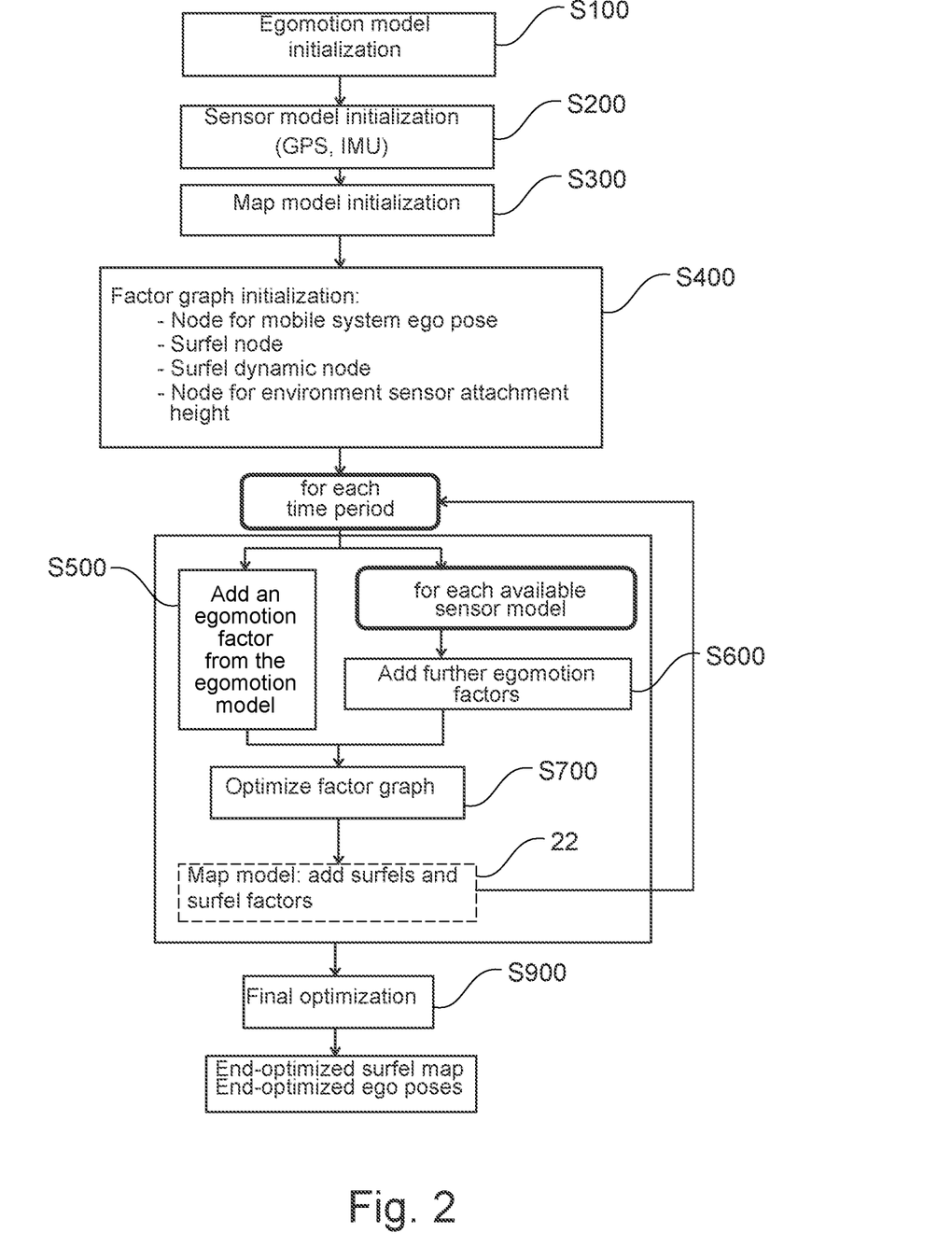
FIG. 2 schematically shows a sequence of a SLAM method according to another preferred embodiment example of the invention.
Figure 3:
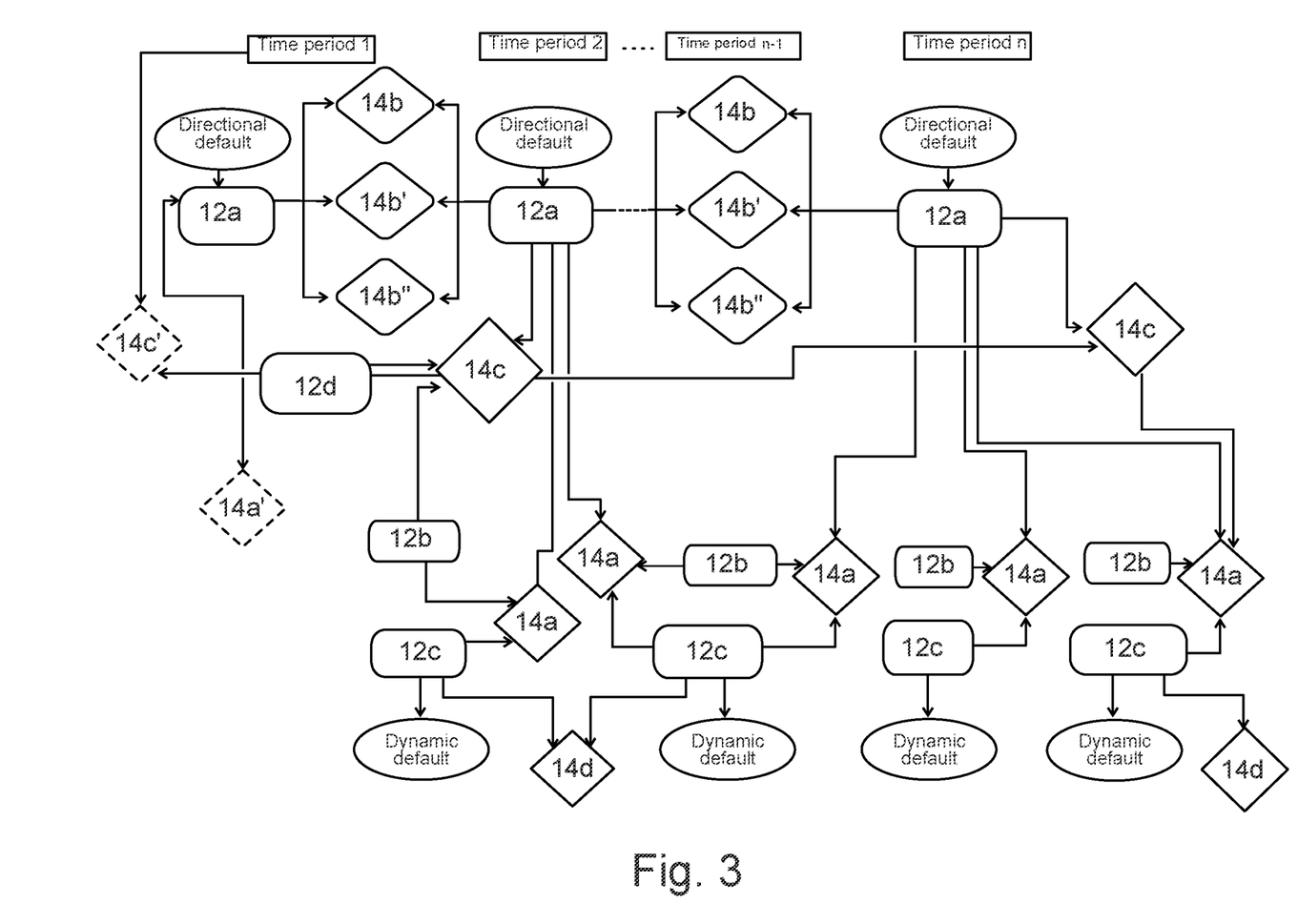
FIG. 3 schematically shows another example factor graph that has been created by the SLAM method from FIG. 2.

FIG. 2 schematically shows a sequence of a preferred embodiment example of a SLAM method. Hereinafter, the steps of the method will be explained with reference to FIGS. 2 and 3, with FIG. 3 illustrating another example factor graph 10.

Once an egomotion model of the mobile system, a sensor model, and a map model have been initialized in the preparatory steps S100, S200, S300, the factor graph 10 is then incrementally created. The sensor model is initialized S200 in consideration of the available resources. In this embodiment example, as well as environment sensor data from an environment sensor that is attached to the mobile system and has surveyed the area surrounding the mobile system, further egomotion sensor data are also available, namely inertia sensor data and GPS data. The environment sensor data are LiDAR sensor data in this embodiment example.

To incrementally create the factor graph 10, it first has to be initialized, which is carried out in step S400. To do so, the types of nodes 12 are first defined. In this embodiment example, four types of node are used. Similarly to FIG. 1, nodes 12a that represent a specific ego pose of the mobile system, and surfel nodes 12b that represent a specific surfel 16 in map coordinates are initialized. In the present case, each surfel 16 is additionally assigned a variable dynamic value, which is initialized as a surfel dynamic node 12c. Also initialized is a node 12d that represents an attachment height of the environment sensor on the mobile system. The nodes 12 are shown in rectangular boxes with rounded corners in FIG. 3.

Next, the factor graph 10 is incrementally built and the optimization problem represented by the factor graph 10 is incrementally solved by firstly receiving the environment sensor data representing the area surrounding the mobile system as a point cloud 18 in a specific time period 20. After that, for each specific time period 20, the corresponding node 12a representing the specific ego pose of the mobile system is added to the factor graph 10, and egomotion factors 14b. 14b'. 14b" are added between two nodes 12a representing ego poses (steps S500) and S600). Factors 14 are shown as diamonds in FIG. 3.

Since further resources are available in this embodiment example, the egomotion factor 14b is based on the model assumptions of the egomotion model and at the same time on the received egomotion sensor data. Therefore. FIG. 3 shows three diamonds between each node 12a representing the ego pose of the mobile system, i.e., a factor 14b from the egomotion model, a factor 14b' from the received inertial measurement unit data, and a factor 14b" from the received GPS data.

Figure 4:
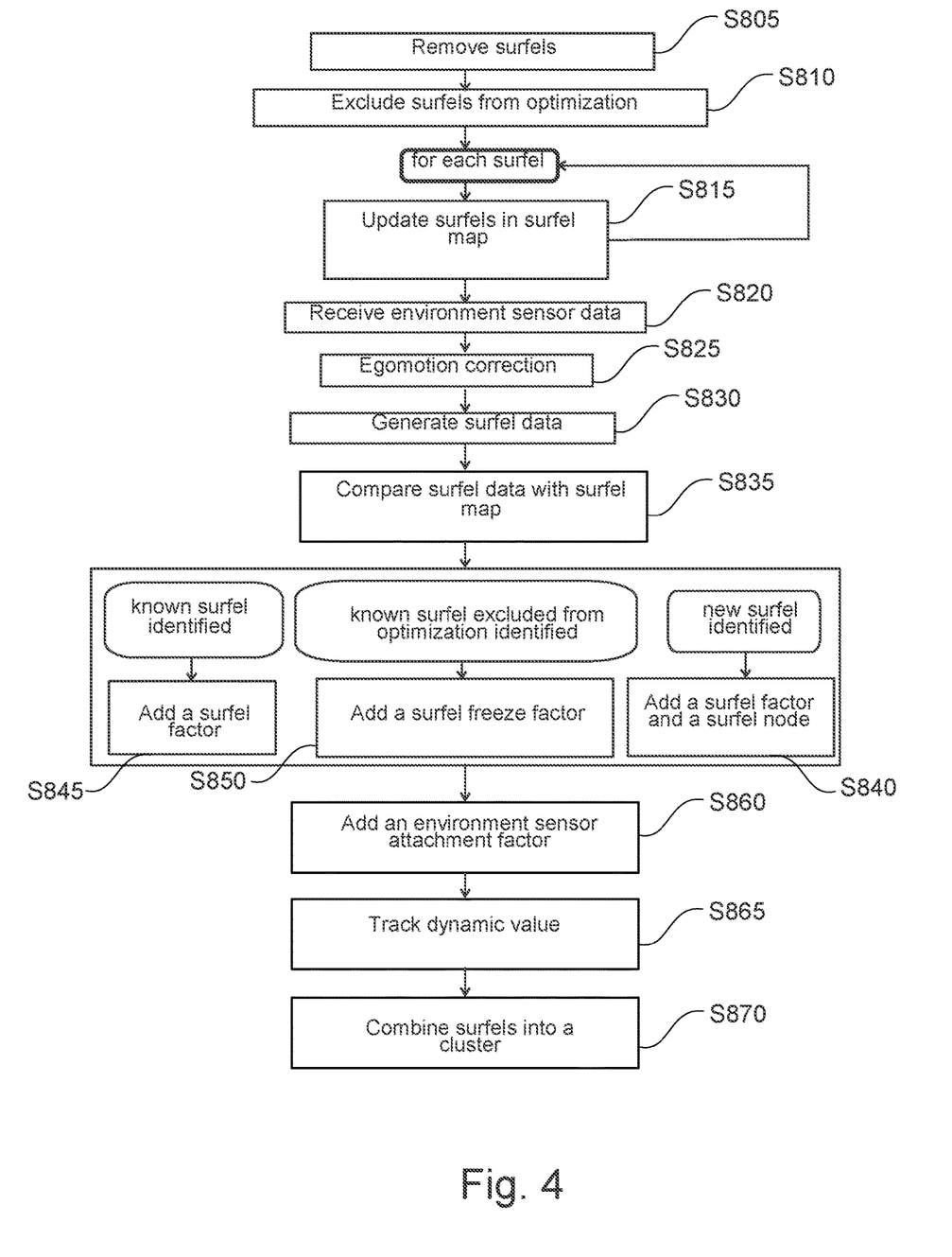
FIG. 4 schematically shows a more detailed sequence of the steps that were combined in one sequence box in FIG. 2.

Next (step S700), the optimization problem represented by the factor graph 10 created thus far is solved in order to obtain a first estimation for the ego pose of the mobile system. The subsequent steps are carried out by the map model and are combined in one sequence box 22 in FIG. 2, since FIG. 4 illustrates these steps in detail. However, the steps within the sequence box 22 are addressed briefly here to aid understanding. Once a first estimation for the ego pose of the mobile system has been obtained, surfel data are generated from the received environment sensor data, and new surfels 16 and known surfels 16 are identified in the thus generated surfels 16 by comparing the surfel data with the surfel map. For new surfels 16, a surfel node 12b and a surfel factor 14a are added to the factor graph 10. For surfels 16 identified as known surfels, a surfel factor 14a is added to the factor graph 10. This process is repeated for each specific time period 20 until all the specific time periods 20 of the received environment sensor data have been processed. Next, in step S900, the optimization problem is definitively solved, from which the end-optimized surfel map and the end-optimized ego poses of the mobile system in each specific time period 20 of the received environment sensor data are derived.

FIG. 4 shows a more detailed schematic sequence of the steps that are combined in one sequence box 22 in FIG. 2 and carried out by the map model. First, in step S805, surfels 16 that have not yet been used to identify known surfels 16 when the surfel data are compared with the surfel map are removed from the surfel map. In addition, in step S810, certain surfels 16 are excluded from further optimization if that surfel has not been used to identify known surfels for a predefined amount of time, if that surfel has contributed a predefined number of surfel factors to the factor graph 10, and/or if that surfel has already been part of the optimization problem for more than a predefined number of iterations. The surfel is excluded from the optimization by replacing the surfel factor 14a with a surfel freeze factor 14a' in the factor graph 10.

Next, in step S815, all the surfels 16 in the surfel map are updated on the basis of the solution found so far by the optimization. As already mentioned in relation to FIG. 2, the environment sensor data received in step S820 are then processed. For this purpose, in step S825, an egomotion correction of the point cloud 18 is first carried out by taking account of the currently estimated speed of the mobile system, i.e., the difference in the ego poses between two directly successive time periods divided by the length of a time period. Next, in step S830, surfels 16 are created by converting the point cloud 18 of the received environment sensor data into surfel data.

The surfel data are compared with the surfel map in step S835 in order to identify known and new surfels 16 in the generated surfels 16. In this embodiment example shown in FIG. 4, a distinction is drawn between three cases. For newly identified surfels 16, a new surfel node 12b representing this surfel and a surfel factor 14a are added to the factor graph 10 (S840). For known surfels 16, however, the surfel factor 14a is added to the factor graph 10 (S845 and S850). In this case, a distinction is also drawn as to whether or not the known surfel 16 is a surfel 16 excluded from further optimization. In the event that it is excluded from further optimization, the added surfel factor 14a is a surfel freeze factor 14a', as indicated in dashed form in FIG. 3 (step S840).

Next, in step S860, surfels 16 representing roads are identified in the surfel map, and an environment sensor attachment factor 14c is added to the factor graph 10 for surfels identified as representing a road. In the event that the surfel representing the road is a surfel excluded from optimization, a frozen environment sensor attachment factor 14c' is added.

Next, in step S865, as will be described in even more detail below in relation to FIG. 6, the dynamic value assigned to the surfel 16 is tracked, and in step S870, as will likewise be described in even more detail in relation to FIG. 7, the surfels 16 identified as known surfels are combined into clusters on the basis of their spatial distance from one another and/or their similar orientation with respect to one another.

Figure 5:
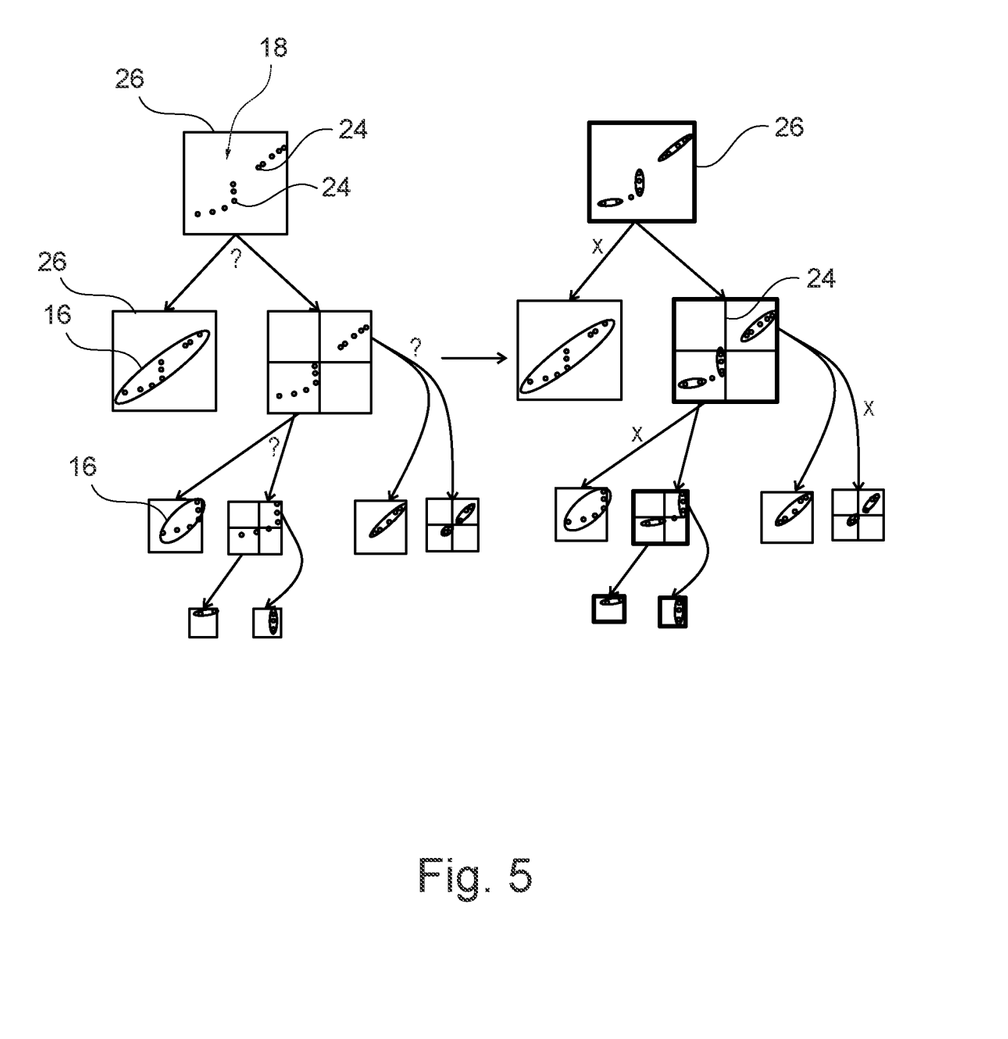
FIG. 5 schematically shows a recursive method for ascertaining surfels from a point cloud, according to a preferred embodiment example of the invention.

First, however, it will be explained with reference to FIG. 5 how surfels 16 are generated from the point cloud 18 of the received environment sensor data via a recursive method according to a preferred embodiment example. For this purpose, the individual points 24 of the point cloud 18 are assigned to predefined voxels 26, each voxel 26 constituting a volume fraction of the surrounding area. FIG. 5 shows a two-dimensional example, so a voxel 26 is represented by a square. Via a principal-component analysis, first surfels 16 are generated for all voxels 26 using the points, which are each assigned to one voxel 26. The surfels 26 are shown in FIG. 5 by an elliptical border around the points 24 of the point cloud 18. Next, all the voxels 26 are subdivided into subvoxels 28, and then second surfels 16 are generated by a principal-component analysis. By comparing a quality rating of the generated first surfels 16 with the generated second surfels 16, and repeatedly carrying out the two previous steps, on condition that each previous second surfel 16 corresponds to the first surfels 16 when the step is repeated and the previous subvoxels 28 correspond to the new voxels 26, the most suitable surfels 26 are ascertained if the comparison of the quality rating of the generated first surfels 16 gives a better quality rating for the first surfels 16 or if the subvoxel 28 generated by subdividing does not reach a predefined minimum number of points 24.

Figure 6:
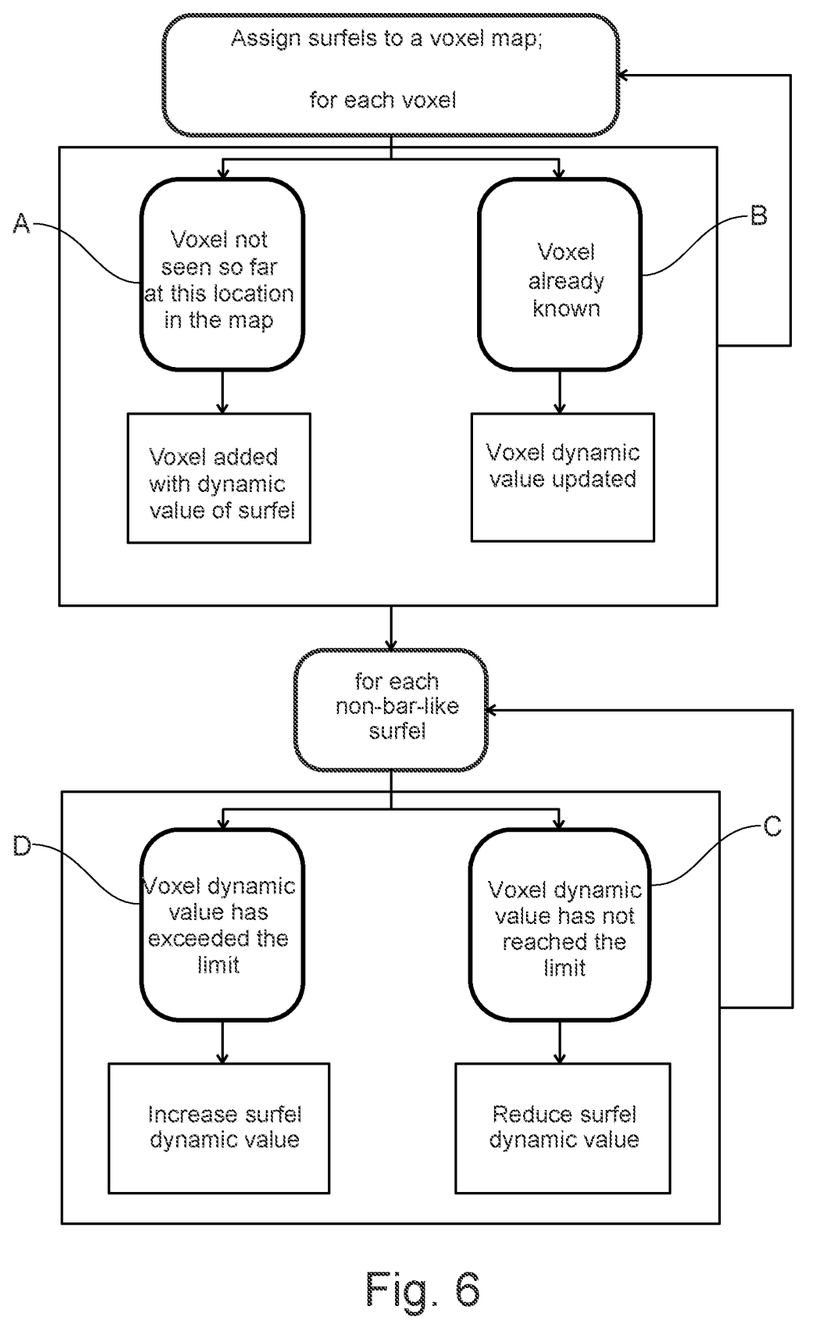
FIG. 6 schematically shows a sequence for tracking a dynamic value allocated to a surfel, according to a preferred embodiment example of the invention.

FIG. 6 schematically shows a sequence showing how the dynamic value allocated to each surfel 16 is tracked, according to another preferred embodiment example. First, the surfels 16 are assigned to voxels 26 in a voxel map. If a surfel 16 is intended to be assigned to a voxel 26 located at a location in the voxel map in which no voxel 26 has yet been recorded (see case A in FIG. 6), a new voxel 26 is added at that location in the voxel map and the dynamic value of that one surfel 16 is assigned to this new voxel 26. However, if a surfel 16 is assigned to a voxel 26 that is already present in the voxel map (see case B), the dynamic value assigned to said existing voxel 26 is updated. In the present embodiment example, the update is carried out via an exponentially smoothed average. Next, the updated dynamic value of the voxel 26 is compared with a limit: in case C the dynamic value is reduced for all the disk-like surfels within the voxel 26 if the limit is not reached, and in case D the dynamic value is increased for all the disk-like surfels within the voxel 26 if the limit is exceeded.

Figure 7:
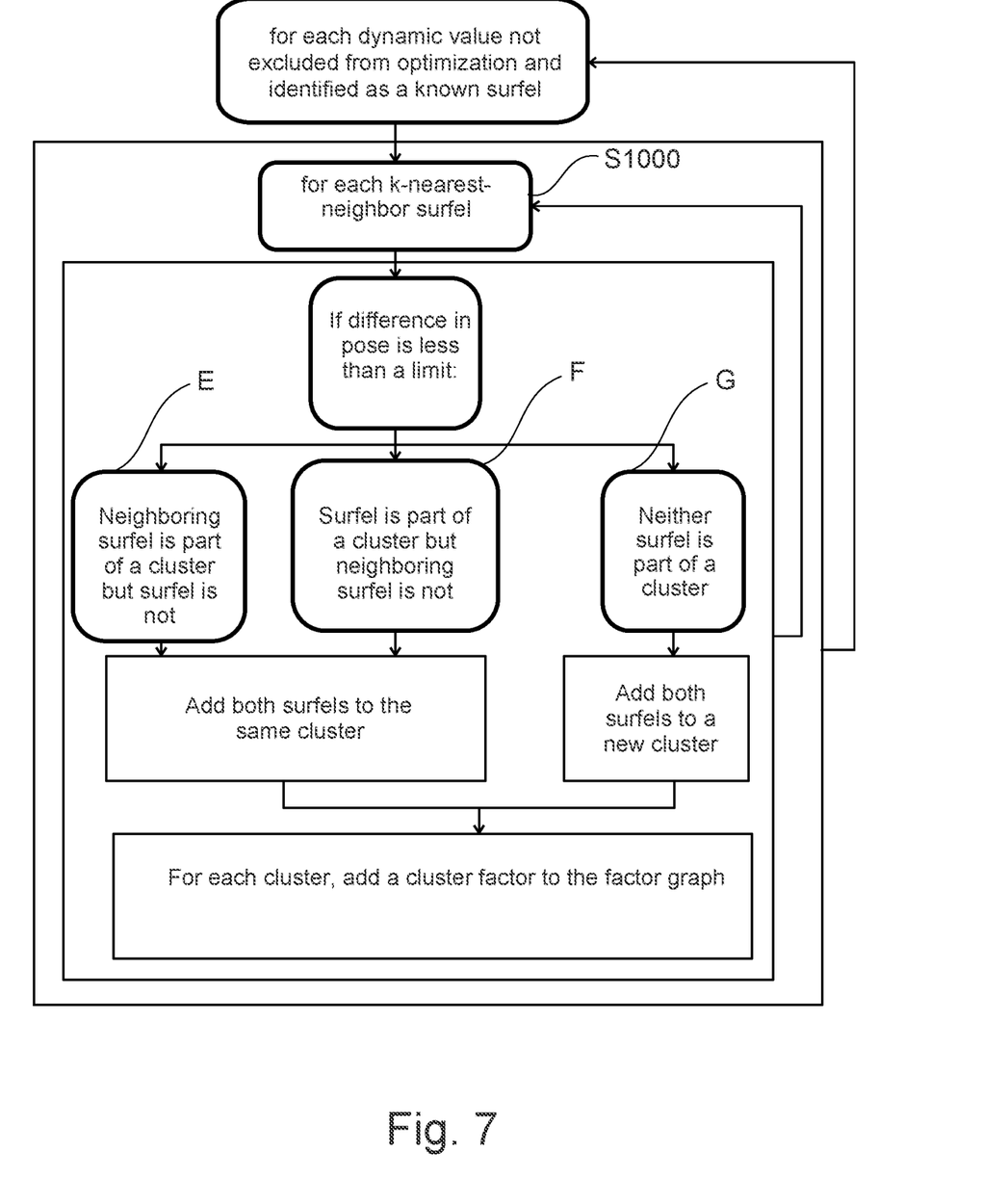
FIG. 7 schematically shows a sequence for combining individual surfels into clusters, according to a preferred embodiment example of the invention.

FIG. 7 schematically shows a sequence showing how surfels 16 identified as known surfels are combined into clusters on the basis of their spatial distance from one another and/or their similar orientation to one another, according to another preferred embodiment example. As can also be seen in FIG. 3, the factor graph 10 has a cluster factor 14d for each cluster, such that differences in the dynamic value of the surfels 16 within a cluster while the optimization problem is being solved are penalized.

In relation to FIG. 7, first, in step S1000, a predefined number of neighboring surfels closest to a specific surfel 16 are identified. If, in cases E and F, the difference in the poses for a pair composed of a neighboring surfel and the specific surfel 16 is less than a predefined limit, and one of the two surfels 16 of the pair is already assigned to a cluster, the other surfel 16 of the pair is likewise assigned to that cluster. If, in case G, however, none of the surfels 16 of the pair is assigned to a cluster, a new cluster is generated. Lastly, a cluster factor 14d is added to the factor graph 10 for each cluster.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Factor graph
12 Node

12a Node representing ego pose
12b Surfel node
12c Surfel dynamic node
12d Node representing the attachment height of an environment sensor on the mobile system
14 Factor
14a Surfel factor
14a' Surfel freeze factor
14b Egomotion factor
14b' Factor for inertial measurement unit data
14b" Factor for GPS data
14c Environment sensor attachment factor
14c' Frozen environment sensor attachment factor
14d Cluster factor
16 Surfel
18 Point cloud
20 Time period, frame
22 Sequence box
24 Points
26 Voxel
28 Subvoxel

The invention claimed is:

1. A computer-implemented method for determining an ego pose of a mobile system and creating a surfel map, based on 3D ellipsoids, of a surrounding area by means of an optimization problem represented by a factor graph, comprising the steps of:
receiving environment sensor data, wherein the environment sensor data have been generated by at least one environment sensor that is attached to the mobile system and surveys the area surrounding the mobile system, and wherein the environment sensor data represent the area surrounding the mobile system as a point cloud, in each case in a specific time period,
generating surfels by converting the point cloud of the received environment sensor data into surfel data,
identifying new surfels and known surfels in the generated surfels by comparing the surfel data with the surfel map, and
adding a surfel factor for the surfels identified as known surfels to the factor graph and/or adding a surfel node and a surfel factor for surfels identified as new surfels to the factor graph,
wherein a node of the factor graph represents a specific ego pose of the mobile system or, when in the form of a surfel node, a specific surfel in map coordinates,
wherein an edge between a node that represents an ego pose and a node that represents a surfel represents, as a surfel factor, a spatial restriction between the ego pose represented by the node and the surfel that is identifiable for the environment sensor from the specific ego pose, and includes a probability distribution in relation to the representability of that surfel for the environment sensor from the specific ego pose, and
wherein the factor graph representing the optimization problem is incrementally created after the environment sensor data of a first specific time period are received, and the optimization problem is incrementally solved before the surfel factors of the surfels identified as known surfels, and/or before the surfel nodes and surfel factors of the new surfels are added to the factor graph, and the steps are repeated for environment sensor data of a later specific time period than the first specific time period.

2. The method according to claim 1, wherein an edge between two nodes representing ego poses includes an egomotion factor, which represents a spatial restriction between the ego poses represented by each node and includes a probability distribution in relation to a transformation between the two ego poses.

3. The method according to claim 1, wherein the egomotion factor is based on model assumptions of an egomotion model, or
wherein the method comprises the step of receiving egomotion sensor data, for example inertia sensor data, GPS data, and/or data of the power train system, such as wheel speed sensor data of the mobile system, and the egomotion factor is based on model assumptions of the egomotion model and on the received egomotion sensor data.

4. The method according to claim 1, wherein a) the step of generating surfels by converting the point cloud of the received environment sensor data into surfel data comprises generating surfels in local coordinates of the mobile system, and the step of identifying new surfels and known surfels in the generated surfels by comparing the surfel data with the surfel map comprises transforming the surfels generated in local coordinates of the mobile system into surfels in map coordinates, or
b) the step of generating surfels by converting the point cloud of the received environment sensor data into surfel data comprises transforming the point cloud of local coordinates of the mobile system into map coordinates of the surfel map and generating surfels in map coordinates by converting the point cloud that has been transformed into map coordinates.

5. The method according to claim 1, wherein the step of generating surfels by converting the point cloud of the received environment sensor data into surfel data is carried out recursively and comprises the following steps:
assigning individual points of the point cloud to predefined voxels, wherein each voxel constitutes a volume fraction of the surrounding area,
generating first surfels for all the voxels by carrying out a principal-component analysis using the points, which are each assigned to one voxel,
subdividing all the voxels into subvoxels and then generating second surfels for all the subvoxels by carrying out a principal-component analysis using the points assigned to the subvoxel in each case,
comparing a quality rating of the generated first surfels with the generated second surfels, and
repeatedly carrying out the two previous steps until the comparison of the quality rating of the generated first surfels gives a better quality rating for the first surfel or until the subvoxel generated by subdividing falls below a predefined minimum number of points.

6. The method according to claim 5, wherein the quality rating includes an average of a weighted sum of the following values over all the generated surfels: a value based on the extent of the surfel along its two longest principal axes, a value based on the extent of the surfel along its shortest principal axis, a value based on the combination of the two aforementioned values, and a value based on the resemblance of the surfel to a bar.

7. The method according to claim 1, wherein each surfel is assigned a dynamic value that can be varied when solving the optimization problem, and wherein the dynamic value characterizes the surfel as non-dynamic when starting to solve the optimization problem.

8. The method according to claim 1, wherein each surfel is assigned a dynamic value that can be varied when solving the optimization problem, wherein a mapping error between the known surfels and the generated surfels is determined in the step of identifying new surfels and known surfels in the generated surfels by comparing the surfel data with the surfel map, and the mapping error is weighted with the dynamic value when solving the optimization problem.

9. The method according to claim 8, wherein an increase in the dynamic value of the surfel while the optimization problem is being solved is penalized.

10. The method according to claim 1, wherein each surfel is assigned a dynamic value that can be varied when solving the optimization problem, wherein surfels identified as known surfels are combined into clusters on the basis of their spatial distance from one another and/or their similar orientation to one another, and wherein the factor graph has a cluster factor for each cluster such that differences in the dynamic value of the surfels within a cluster while the optimization problem is being solved are penalized.

11. The method according to claim 1, wherein the received environment sensor data have a measurement time for each point of the point cloud, and the step of identifying new surfels and known surfels in the generated surfels by comparing the surfel data with the surfel map comprises generating rectified surfels from the surfel data by taking account of an estimated speed of the mobile system, and comparing the rectified surfel data with the surfel map.

12. A data processing device comprising means for carrying out the method according to claim 1.

13. A computer program product comprising commands which, when the program is executed by a computer, cause the computer to carry out the method according to claim 1.

14. A tangible, non-transitory computer-readable data medium on which the computer program product according to claim 13 is stored.

* * * * *